June 16, 1931.  J. N. SCISM  1,810,538
MOTOR MOUNTING
Filed June 14, 1928   6 Sheets-Sheet 1
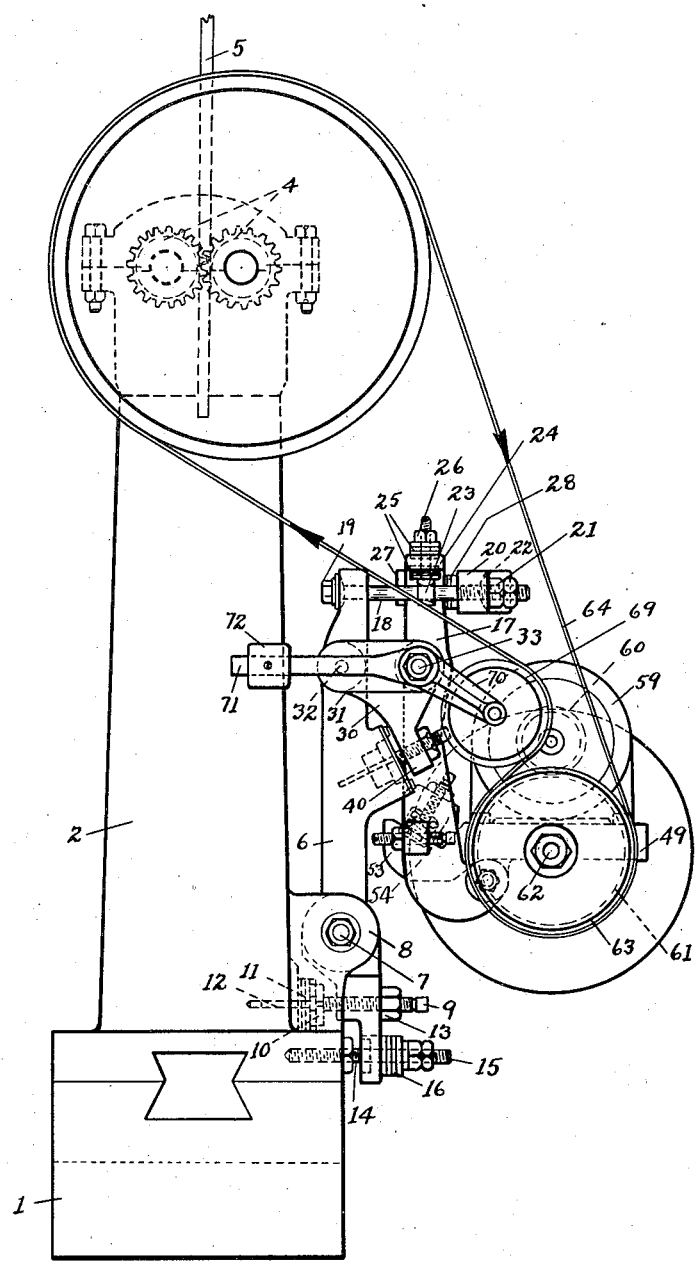
FIG. I
INVENTOR
JOHN N. SCISM
by *William B. Wharton*
his attorney

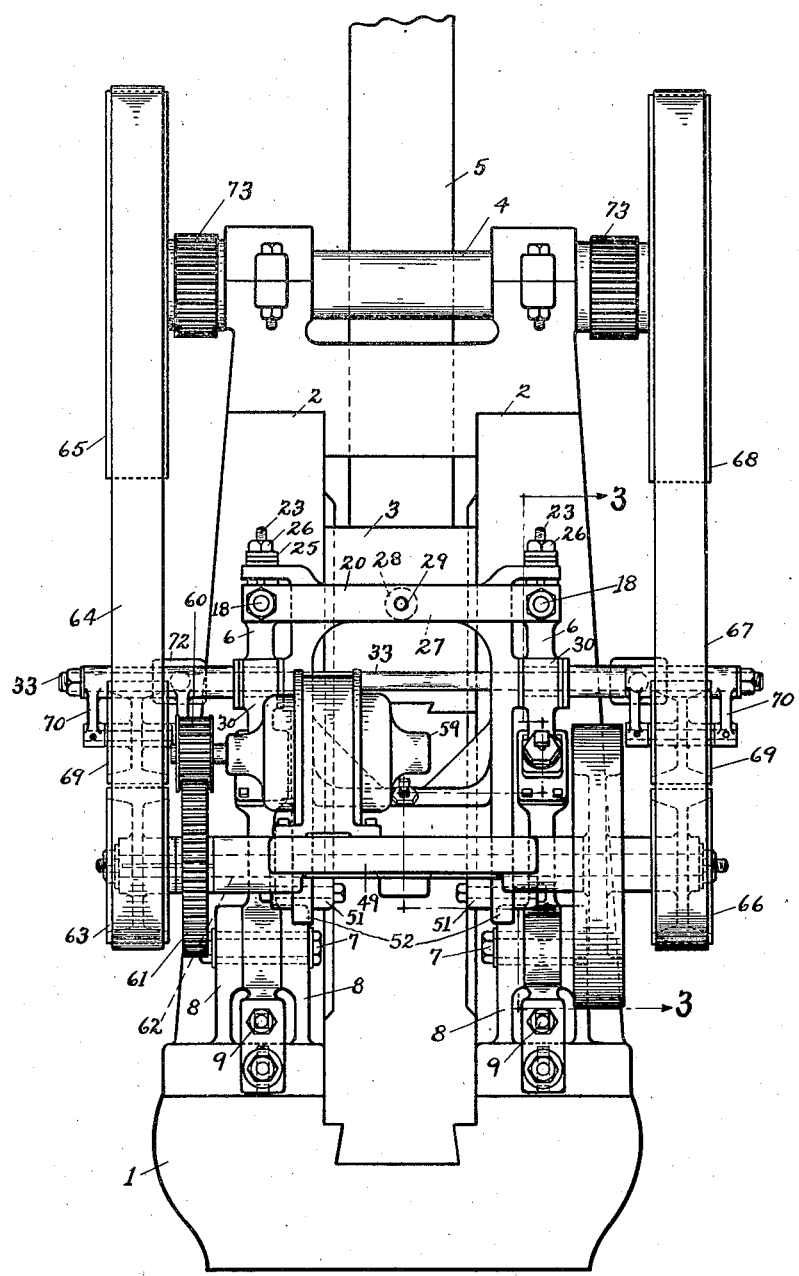
FIG. II

June 16, 1931.  J. N. SCISM  1,810,538
MOTOR MOUNTING
Filed June 14, 1928  6 Sheets-Sheet 3
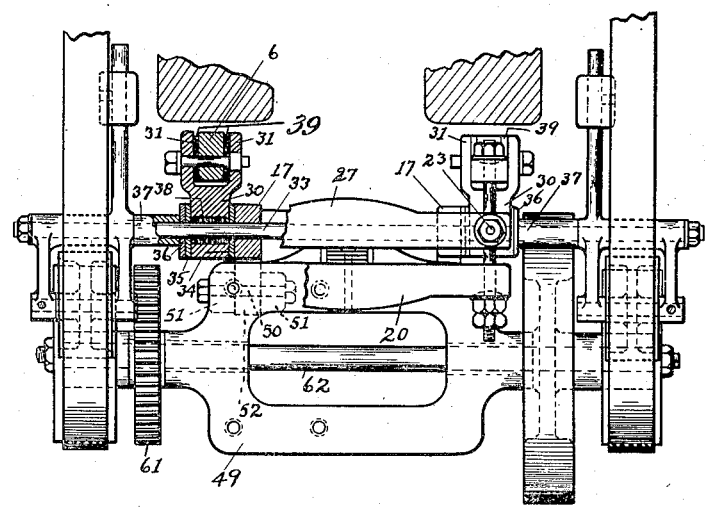
FIG. V
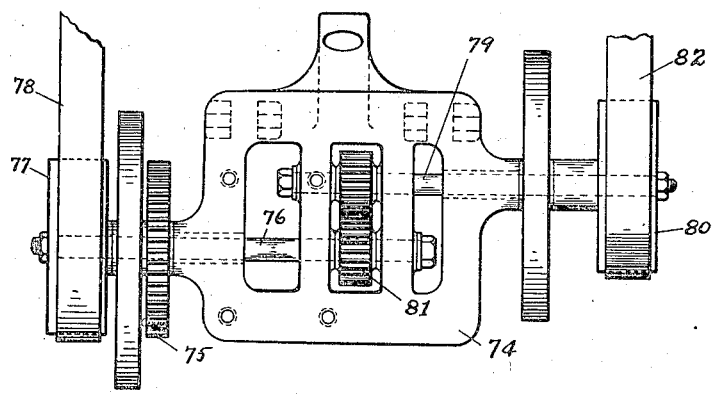
FIG. VI
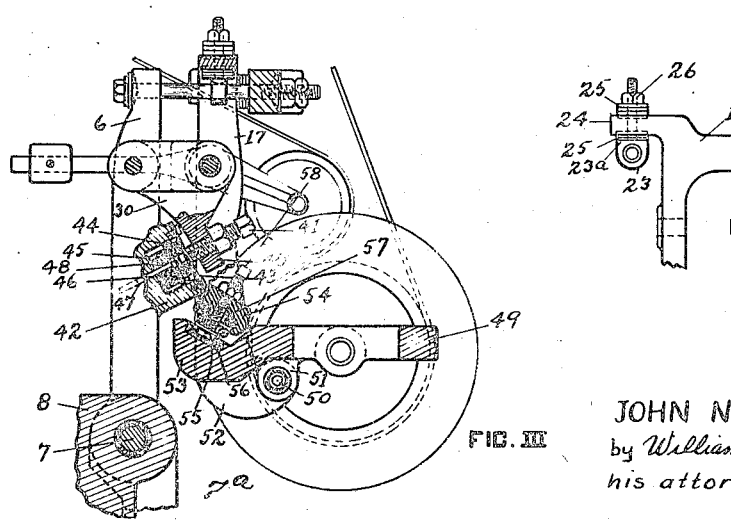
FIG. III
FIG. IV
INVENTOR
JOHN N. SCISM
by William B Wharton
his attorney June 16, 1931.  J. N. SCISM  1,810,538
MOTOR MOUNTING
Filed June 14, 1928     6 Sheets-Sheet 4
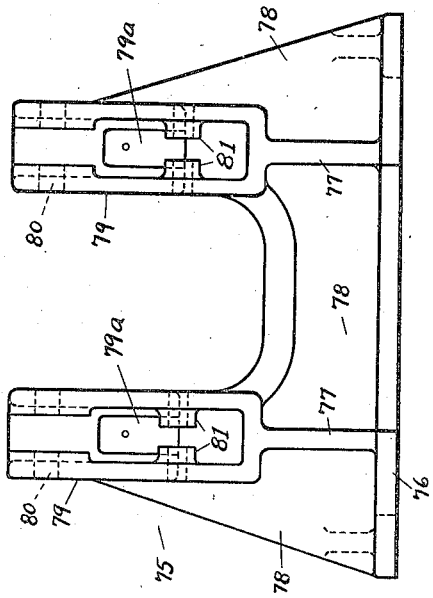
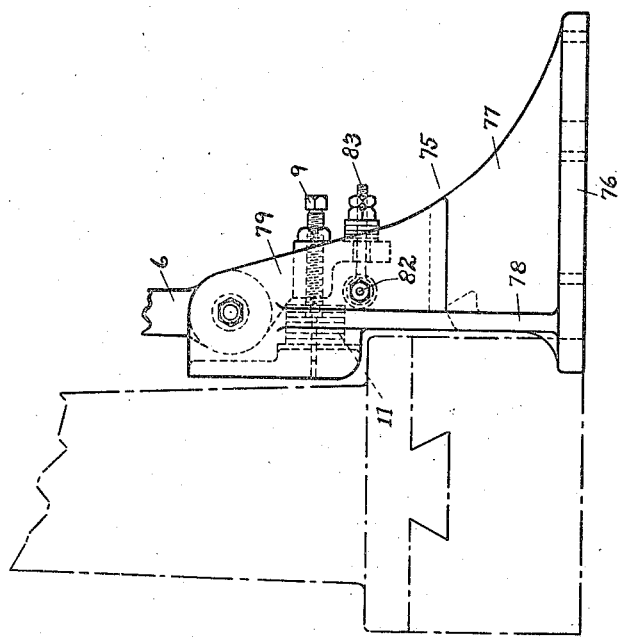
INVENTOR
JOHN N. SCISM
by William B Wharton
his attorney

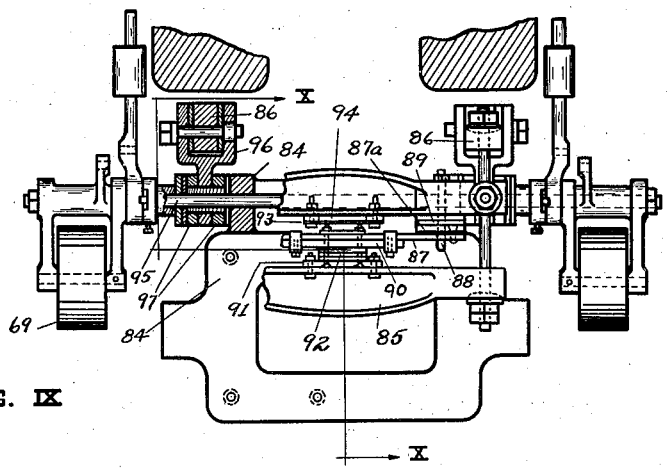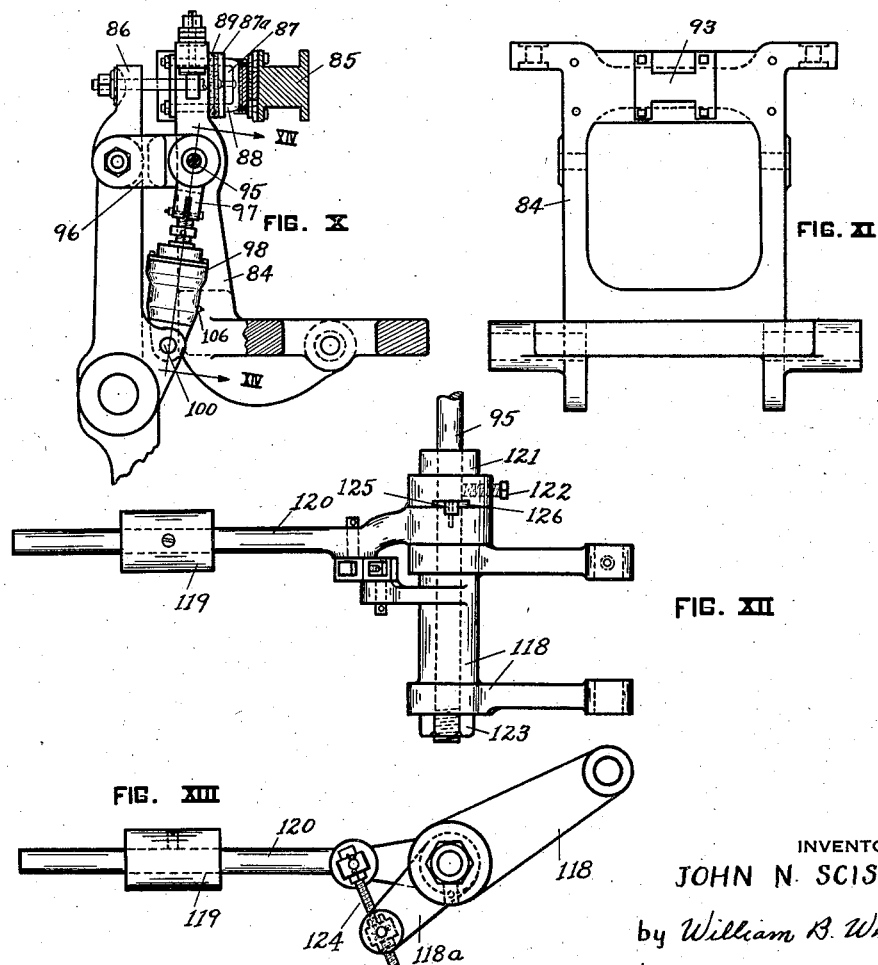

June 16, 1931. J. N. SCISM 1,810,538
MOTOR MOUNTING
Filed June 14, 1928    6 Sheets-Sheet 6
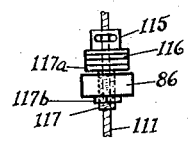
FIG. XVIII
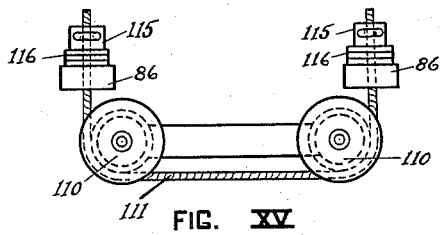
FIG. XV
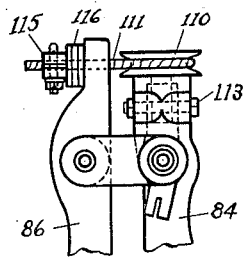
FIG. XVI
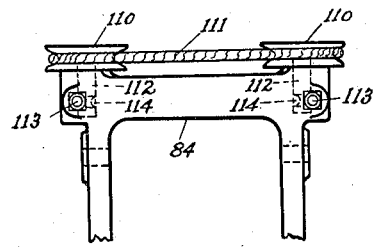
FIG. XVII
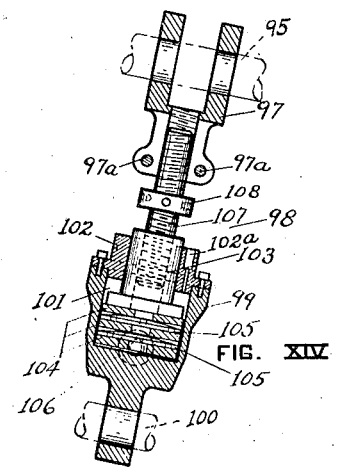
FIG. XIV
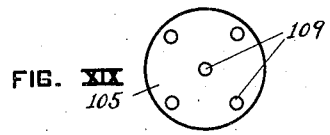
FIG. XIX
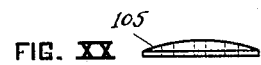
FIG. XX
INVENTOR
JOHN N. SCISM
by William B Wharton
his attorney Patented June 16, 1931

1,810,538

UNITED STATES PATENT OFFICE

JOHN N. SCISM, OF WILKINSBURG, PENNSYLVANIA

MOTOR MOUNTING

Application filed June 14, 1928. Serial No. 285,308.

This invention relates to a motor mounting for board hammers and for other machines in which the motor and its driving connections are to be protected from vertical and horizontal shocks, and from any jars caused by the action of the machine.

At the present time it has been found impractical to operate board hammers which are materially over the 3000 pound class. This is for the reason that the pulling up of the larger hammer heads causes severe jerks on the belts and pulleys which drive the hammer elevating pulleys, and when such hammers are driven from a shaft which is attached to parts of a building, as is usual in practice, the said jerking strains of the belts are too severe for the building to withstand. The present invention eliminates the above objections by supporting a motor drive adjacent the rear portion of the hammer, and has no part thereof connected to the building. This method provides a compact unit machine which may also be used to advantage in smaller machines below the 3000 pound class.

When a number of hammers are driven from a common line shafting in the usual manner, a break-down of said shafting often places several machines out of commission. A direct motor driven machine obviously overcomes such objections. Furthermore, due to the relative inexpensiveness of board hammers, and due to a greater economy in labor and up-keep as compared to steam hammers, it is desirable to provide a practical driving device so that larger sized board hammers may be used.

One object of the invention is to provide a motor mounting in which the motor carrying platform is so supported by flexible and resilient means that vibrations and shocks caused by the operation of the machine which the motor actuates, or arising from other causes, are cushioned and are not transmitted to the motor or its connections.

Another object of the invention is to provide a motor mounting for fulfilling the above purposes which may be attached directly to, or mounted closely adjacent, the base of the machine which is to be actuated by the motor.

Another object of the invention is to so arrange the motor mounting that a board hammer may be driven by the motor through a simple belt connection therewith without impairing the shock insulating qualities of the mounting. A further object of the invention is to provide a motor mounting for board hammers which is so arranged that the driving belts tend to resiliently support a portion of the weight of the driving means.

A still further object of the invention is to arrange a motor mounting with driving belts tending to support the mounting and having counterweighted idler pulleys associated therewith, so that the belts, the idlers and the inertia of the counterweights tend to function as a stabilizer to resist sudden movement of the belts and the motor mounting means caused by jerking strains on the belts.

In the accompanying drawings Figure I is a side elevation of a board hammer, showing a motor and a mounting constructed according to the principles of the present invention and mounted on said hammer; Figure II is a rear elevation of the motor mounting and board hammer shown in Figure I; Figure III is a detail sectional view of the supporting connections for the motor carrying platform, taken on the irregular section line 3—3 of Fig. II; Figure IV is a segmental detail of interconnecting means between two of the mounting members of the device; Figure V is a plan view of the motor carrying platform, its mounting means, and the driving conections to the machine with which the motor is associated; Figure VI is a similar plan view of a modified motor carrying platform and its driving connections; Figure VII is a side elevation of an independent unit for supporting the motor mounting and its driving connections, showing the same positioned adjacent the base of a board hammer; Figure VIII is a rear elevation of the frame of the unit shown in Fig. VII; Figure IX is a segmental plan view of the motor mounting showing modified shock absorbing means; Figure X is a side elevation of the same taken on the line X—X of Fig. IX; Figure XI is a front elevation of the motor mounting platform and its frame as used in the modification of Figs. IX and X; Figure XII is a detail plan view of a special idler pulley bracket; Figure XIII is a side elevation of the same; Figure XIV is a sectional view taken on the line XIV—XIV of Fig. X; Figure XV is a plan view of a further modification of certain cushioning means for the motor mounting; Figure XVI is a side elevation and Figure XVII is a front elevation of the same; Figure XVIII is a detail of the rope holding clamp hereinafter described; Figure XIX is a plan view of a metal washer particularly adapted for the cushioning means as will be set forth in detail in the following specification; and Figure XX is a side elevation of the same.

In the drawings the board hammer is shown with a base 1, and with housings 2 which slidably support a hammer head 3. The rollers 4 are arranged to act on an elevating board 5 to raise the head 3 when desired. The particular form of hammer and elevating apparatus forms no part of the present invention, and for this reason a detail description thereof will not be given.

As shown in Figures I and II, the support for the motor and driving connections is mounted directly on the base 1 and housings 2 of the hammer. One set of elements of this support comprise a pair of vertical links 6 which are pivotally mounted on bolts 7 in lugs 8 of the housings 2. As is seen in Figure III, bolts 7 are materially smaller than the holes in lugs 8 and links 6 through which said bolts pass. This permits a packing 7a of any suitable fibrous material to be compressed around bolts 7 to act as a resilient bushing therefor. This packing not only contributes to the general cushioning effect, to be fully described, but also prevents crystallization or fatigue of the metallic elements.

Means are provided to cooperate with the pivoted mounting of the links to prevent the direct transmission of vibrations caused by operation of the machine, these means also serving to cushion vertical shocks of hammer blows and check any oscillation of the links about their mounting shaft. Such means comprise bolts 9, which are threaded through the lower portion of each of the links 6. These bolts bear against metallic washers 10, which in turn bear against compressible packing material, such as washers 11 of leather, asbestos, or other material of similar characteristics. The assembly of compressible washers 11 is positioned by means of a pin 12 extending into a suitable orifice in the housing 2 of the hammer frame. Each of these bolts 9 carries a nut 13, which bears against the outer face of the link to lock said bolts in the adjusted position. Cooperating with these cushioning means are long bolts 14, which extend into the housing or base of the hammer and are threaded therein. Between the ends 15 on these bolts and the exterior surface of the links 6 are resilient packing means such as a plurality of asbestos or leather washers 16. The arrangement obviously resiliently dampens the tendency of the links 6 to vibrate radially around the bolts 7, and also provides and independent means of adjustment for the links 6 to obtain a proper alignment of shaft 62.

Connected to and mounted on the links 6 is a frame 17. Adjacent the upper extremities of the links 6 are bolts 18 passing therethrough. On the bolts 18 are bolt heads 19 each bearing against a spherical washer seated in a depression on the inner surface of the link. At the outer ends of the bolts 18 is a cross arm 20. On the said bolts 18 are nuts 21 which bear againsts spherical washers 22 that are seated in the cupped depressions in the cross arm. Each of the bolts 18 is secured to the frame 17 by means of an eye bolt 23 passing through an extension 24 of the frame, and held therein by nut 26. As shown in detail in Figure IV, means such as a plurality of compressible washers 25 are interposed between the upper surface of the extension 24 and a nut 26 thereon and between the lower surface of the extension 24 and the eye bolt shoulder 23a. The frame 17 has formed integral therewith a cross arm 27 which lies opposite and parallel to the cross arm 20.

Compressible packing material, such as a plurality of resilient washers 28 positioned on the pin 29, (See Fig. II) is interposed between the cross arms 20 and 27 intermediate of their ends. This arrangement tends to equalize the strain on the links 6 and the frame 17. It should be noted that the holes of the eye bolts 23 are double tapered, or divergent, to allow the bolt 18 passing therethrough some angular freedom. This construction in conjunction with the spherical washers mentioned above allows the necessary vertical play between the links 6 and frame 17.

The above described arrangement dampens the vibrations which would otherwise be violently transmitted from the hammer frame to the frame 17. In addition, the resiliently mounted eye bolt connection serves to prevent an over-strain on the bolt 18 or its connecting means due to any vertical vibrations. As will hereinafter appear, the tendency is for the upper portion of the frame 17 to move outwardly and away from the links 6 due to the weight of the motor platform and motor suspended thereon.

Other special connections between the links 6 and frame 17 are provided to prevent the transmission of vertical vibrations to the frame 17. Such means comprise short links 30, which have forked ends 31 arranged to embrace the links 6, and they are arranged to be pivotally connected therewith by means of pins 32. Passing through the links 30 is a shaft 33. This shaft also passes through the frame 17 and serves as a pivotal mounting therefore. Interposed between the inner surfaces of each of the links 30 and the frame 17 are one or more washers 34 of leather or other compressible material. On the outer surfaces of links 30 are one or more washers 35 similarly of leather or other compressible material, and metallic washers 36 bear against the spacing sleeve 37 of the shaft 33. Bushings 38 for the links 30 are preferably composed of fibrous asbestos packing or other suitable yielding material. This shaft mounting provides a lateral cushioning between the frame 17 and the links 30, and absorbs vibrations or ground shocks which may reach the said links 30.

The engagement between links 6 and the forked ends 31 of the short links 30 is cushioned by means of compressible washers or other suitable packing material 39. These links are provided with extensions 40, each of which has therein a threaded bolt hole for a bolt 41. As shown in Figure I and in detail in Figure III, the links 6 are provided with bosses 42 that are disposed opposite the extensions 40 on the links 30. Each boss 42 is recessed to receive packing material, and is provided with a metallic cover plate 43 having a central hole or aperture through which the bolt 41 passes to engage the metallic washer 44. Compressible material in the recess of each of the bosses 42 preferably consists of a plurality of rubber washers 45, and the washers are positioned by means of a metallic washer 46 and a pin 47. The said pin is countersunk into metallic washer 46, and extends into the body of the link 6. A moderately compressible member, such as a cork washer 48, may desirably be interposed between the metallic washer 44 and metallic washer 47. It is obvious that helical springs may be used in place of the rubber washers 45.

The motor carrying platform 49 is pivotally supported on the frame 17 by means of pins 50 passing through lugs 51 on the platform and extensions 52 on the frame 17. A cross arm 54 integral with the frame 17 bears on a suitable cushioning means between the inner portion 53 of platform 49 and the cross bar 54. The said cushioning means is shown in Fig. III as a coiled spring 55 which rests in the seat 56 of the portion 53, and in the seat 57 of the cross bar 54. A bolt 58 is desirably provided for centering the spring and for definitely limiting the rotative movement of the platform. This latter cushioning device also assists in equalizing the strains in the members 17 and 49.

As said heretofore, the actuating motor 59 is mounted on the platform 49, and the pinion 60 on the motor shaft meshes with a gear 61 on a shaft 62. Shaft 62 carries a pulley 63 over which passes a belt 64. Belt 64 also passes over a pulley 65 for actuating the rollers 4 of the board hammer. Shaft 62 also carries a pulley 66 over which passes belt 67 which drives pulley 68 also connected to the elevating rolls.

Cooperating with each of the belts 65 and 67 is an idler pulley 69. These idler pulleys 69 are carried in the frames 70 which are freely mounted on a shaft 33. Projecting inwardly from each of the frames 70 is an extension 71 which carries an adjustable counter-weight 72. The said idler pulleys 69 serve to keep the driving belts taut at all times, and serve to prevent the passage of vibrations from the hammer frame to the motor connections by way of the driving belts. That is, if a shock tends to tighten the belt by reason of motor mounting swaying a slight amount, the idler pulley gives way to compensate for such action.

In order to obtain a, so called, floating condition of the motor mounting, and also to make the cushioning means of the said motor mounting more shock absorbing, the belts 64 and 67 are maintained taut by the counterweighted idler pulleys associated therewith. That is, this arrangement permits the driving belts to support or suspend an appreciable portion of the weight of the motor and its mounting platform. It is important to note that the inertia of the idler pulley counterweights 72 tend to retard any sudden downward movement of the motor mounting. That is, the inertia of the said counterweights resists sudden downward movements of the motor platform, which may be caused by jerking of the belt, this resistance to downward movement serving to prevent continued oscillation of the platform. In order to utilize this shock absorbing quality of the counterweights and belts, it is better to place the pulleys 63 and 66 as nearly as possible under the elevating pulleys 65 and 68.

In the machine as shown, pulleys 65 and 68 are each fixed to the same roll, and gears 73 are necessary to cause the opposing elevating roll to rotate. In case it is desired to do without the intergearing 73, and to drive each of the board rolls individually, it is necessary to fix the pulley 65 to one of the rolls 4, and to fix the pulley 68 to the other of said rolls. To accomplish this, a modified form of motor platform 74 is essential. As shown in Figure VI, the motor 59 may be mounted on the platform 74, and the motor pinion can be meshed with the gear 75 which is fixed on shaft 76. The shaft 76 also carries pulley 77 over which passes a belt 78 to drive one of the rolls. Shaft 79 carries a pulley 80 which, due to the gears 81, rotates in the opposite direction to pulley 77. When the belt 82 is passed over a pulley on the elevating roll opposed to the roll driven by belt 78 the desired counter-rotation of the elevating rolls 4 is had without the gearing 73.

In general it may be added that the packing 7a, which surrounds the link supporting bolts 7, serves to cushion angular vibrations and ground shocks. The same effect is obtained by the compressible bushings 38 on the shaft 33. Vibrations of the links 6 about their axis are cushioned by the packing material associated with the bolts 9 and 14.

The connection between the links 6 and frame 17 is cushioned by the compressible washers 28 interposed between the cross arms 22 and 27 against vibrations tending to separate the upper extremities of the links and of the frame. The connections between these members is also cushioned against vertical vibrations by the arrangement of links 30, and by the compressible material in the bosses 42 on the links 6. The transmission of lateral vibrations to the frame 17 is lessened by the compressible washers 39 between links 6 and short links 30, and by the washers 34 between portions of the frame 17 and the links 30 adjacent the shaft 33.

The motor carrying platform (either the platform 49 or the modified platform 74) is in turn cushioned against the transmission of vibrations from the frame 17, by its pivoted mounting and by cushioning spring 55.

The modification of Figures VII and VIII constitutes a stand which will support the motor and its mounting means independently of the main hammer frame. This stand, designated generally by the reference numeral 75, has a base 76, with side web portions 77 and a central web portion 78. Upwardly extending ribbed portions 79 provide means for the attachment of the motor carrying connections. Adjacent its upper end each of the portions or members 79 is deeply slotted to receive the lower end of one of the links 6, and is provided with apertures 80 to receive the pivot pin on which the link is mounted. Below the slotted area of the member 79 is a portion 79a against which may lie the compressible washers 11 against which the bolts 9 bear. Bosses 81 provide a bearing for a bolt 82, which passes through the eye of an eye bolt 83 corresponding generally to the bolt 14 described above.

The remaining Figures, IX to XX inclusive, illustrate modifications of various features embodied in the principal disclosure. For example, it may be desirable in certain instances to form the frame 17 and the motor platform 49 integrally. Figures IX, X and XI show a combined frame and platform, designated by the reference numeral 84, incorporated in the motor mounting device as a whole. Due to the integral structure of the member 84 it may be deemed advisable to utilize the resilient device shown in Figures IX and X. The cross bar 85 corresponds to the cross arm 20 described supra, and it is connected to the frame 84 and the vertical links 86 in a manner similar to the interconnection of the cross bar 20, the frame 17, and the links 6.

The chief variation in construction resides in the cushioning device between the upper end of the frame 84 and the cross bar 85. This cushioning device comprises a leaf spring member 87 which is mounted to the upper portion of the frame 84 by the U bolts 88. The member 87, however, is not mounted in contact with the said frame, but has two or more resilient washers 89 arranged, as shown, between the steel plates 87a which are riveted to the ends of the leaf spring member 87. In case one leaf 87 does not prove sufficiently strong, an auxiliary leaf 90 may be shackled thereto. The assembled spring leaves are affixed to the cross bar 85, as illustrated, with the steel plate 91 and resilient members 92 interposed therebetween.

The latter resilient arrangement absorbs the shocks that tend to move through the upper extremities of frame 84 and the links 86. Since there may be a rebound resulting from the displacement of the spring, a bumper plate 93 and a resilient washer 94 shaped in conformation therewith is mounted on the frame 84. Therefore, the tendency of the frame 84 to oscillate in either direction around the shaft 95 is dampened.

It will be noted that the bifurcated link 96 varies slightly from the similar link 30 of the principal form of mounting disclosed. Although this link mutually and pivotally interconnects the frame 84 and the links 86, it does not have the extension 40 which is found on the link 30. Instead, the split sleeve 97 is independently mounted on the shaft 95, and it is associated with vertical cushioning means indicated generally by the reference numeral 98.

Figure XIV shows in sectional detail the latter cushioning means. As said, the split sleeve 97 is mounted on the shaft 95. A recessed head 99 is mounted on a pin 100 in an appropriate setting in the link 86. There is a cushioning device 98 associated with each of the links 86 and the two correspondingly positioned points on the shaft 95. The head 99 having the recess 101 is provided with the cover member 102 which is normally positioned as shown. Slidably passing through the cover 102 is the bearing sleeve 103 which rests on the rubber compression washers 104. Positioned between each successive washer 104 is a metal spherical washer 105. By forming at least one of the surfaces of the washers 105 with a spherical contour it is obviously possible to have the compressible action of the rubber washers more sensitive.

Due to the relatively short life of rubber when the same is free to the deteriorating action of the air, it was thought expedient to fill the recess 101 with water, and in this way greatly prolong the life of the rubber. For this reason the cover 102 is provided with a water filling orifice 102a. This orifice may normally be stopped with waste or a suitable plug. A lower port 106 serves as an opening through which the said water may be withdrawn if desired. A pet-cock or pipe plug may be applied to this port 106.

The two members 97 and 103 are joined by the threaded shaft 107, which, by means of the shoulder 108, may be rotated to give the proper adjustment or relative position of the associated parts. Since one end of the shaft 107 is threaded with right hand threads and the other end thereof is threaded with left hand threads, this adjustment may be very readily made. Two bolts 97a pass through the sleeve of member 97, and they afford means locking the shaft 107 in its desired position. The washers 104 and the washers 105 are provided with holes 109 which aid in allowing the water to displace or flow when a shock is transmitted down the shaft 107, and in the rubber washers 104 the holes also permit the rubber to more readily expand under pressure.

As a further modification of a means for resiliently retaining the upper ends of the links 86 and the frame 84 in the desired position, the wire rope 111 is passed around the two sheaves 110. Figures XV, XVI and XVII show this to advantage. The said sheaves are fixed on the short shafts 112 which are rotatably fitted in the frame as aforesaid. The bolts 113, partially lying in the annular groove 114 of the shafts 112, prevent the sheaves from rising, but permit their free rotation. The rope shackle nuts 115 are locked on the rope at the desired point, and bear against compressible washers 116 which lie against the links 86 as shown in the drawings. Figure XVIII shows a member 117 which has a threaded engagement with the link 86, and it has a head portion 117a against which the washers 116 are held by the rope passing therethrough. By rotating the member 117 the rope 111 may be effectually shortened or lengthened as desired, and the lock nut 117b serves to fix this position. The arrangement is very simple, and due to the sheaves 110 the wire rope is self positioned or centered, and the strains on members 86 are thereby equalized.

It was thought desirable to show in detail the preferable form of idler pulley mounting frame. This is done in Figs. XII and XIII. The frame comprises essentially three portions. The pulley supporting yoke 118 is freely mounted on the shaft 73 or 95. The weight 119 is carried on the arm 120 which is also free to rotate on the said shaft. However, it is desirable to maintain the arm 120 substantially in a horizontal position in order to obtain the maximum torque from the weight.

It is further desirable to secure the proper position of the idler pulley 69. For these reasons the variable adjusting means 124 are arranged between the arm 120 and the extension 118a of the yoke 118. It may readily be seen from the drawings how the adjustment referred to above may be made. The block or stop 121 is fixed to the shaft 95 by means of set screw 122, and in conjunction with the nut 123 fixes the lateral position of the frame on the shaft.

In case the belt should become dislodged from the pulleys of the hammer and the motor mounting, the weight 119 would normally tend to violently drop. To prevent such a contingency there is fixed in the arm member 120 a radial key 125 which rests also in the radial slot 126 of the member 121. The slot 126 is appreciably wider than the key to permit the necessary play of the pulley riding on the belt. If the belt should run off the pulley the weight 119 and arm 120 can fall only a short distance before the key 125 strikes the edge of the slot 126 to prevent further movement of the frame as a whole.

What I claim is:

1. The combination of a drop hammer and a motor mounting therefor comprising a lever having a vertical component of extent pivoted to the drop hammer housing intermediate its length, stop means yieldingly interengaging said housing and the portion of said lever extending below the pivot point of said lever and arranged to definitely limit movement of rotation of the lever in either direction, and a motor platform suspended by pivotal connections from said lever arm upwardly of the plane of mounting of said lever in said housing.

2. The combination of a drop hammer and motor mounting therefor comprising a lever having a vertical component of extent pivoted intermediate its length to the drop hammer housing, means yieldingly interengaging said housing and the portion of said lever extending below the pivot point thereof and arranged to limit movement of rotation of the lever in either direction, a frame pivotally mounted in said lever above the pivot point thereof, and a platform pivotally mounted in said frame below the pivotal connection of said frame to said lever.

3. The combination of a drop hammer with motor mounting means therefor comprising a lever having a vertical component of extent pivoted intermediate its length to the drop hammer housing, means yieldingly interengaging said housing and the portion of said lever extending below the pivot point thereof and arranged to limit movement of rotation of the lever in either direction, a frame pivotally mounted in said lever above the pivot point thereof, equalizing means yieldingly interconnecting said lever and said frame above the pivoted engagement therebetween, and a motor platform pivotally mounted in said frame below the pivotal connection of said frame to said lever.

4. In combination with a drop hammer housing a motor supporting assembly therefor comprising a lever having a vertical component of extent pivotally mounted in said housing, a frame extending substantially parallel to said lever, a link pivotally interconnecting said lever and said frame intermediate the length of both, an extension on said link, and yielding connection between the extension of said link and said lever arranged to limit relative movement of said frame and said lever.

5. In combination with a drop hammer housing a motor supporting assembly comprising a lever having a vertical component of extent pivotally mounted in said housing, a frame extending substantially parallel to said lever, a link pivotally interconnecting said lever and said frame intermediate the length of both, an extension on said link, yielding connections between the extension of said link and said lever arranged to limit relative movement of the frame and lever, and connecting means disposed above said link and yieldingly interengaging the frame and lever, said connecting means being arranged to equalize tendencies toward mutual movement of said frame and said lever.

6. The combination of a drop hammer housing with a motor supporting assembly comprising a lever having a vertical component of extent pivotally mounted in said housing intermediate its length, means yieldingly interengaging said housing and the portion of said lever extending below the pivot point thereof, and arranged to limit movement of rotation of the lever in either direction, a frame extending substantially parallel to said lever, a link pivotally interconnecting said lever and said frame intermediate the length of both, an extension on said link, and yielding connection between the extension of said link and said lever arranged to limit relative movement of said frame and said lever.

7. The combination of a drop hammer housing with a motor supporting assembly therefor comprising a lever having a vertical component of extent pivotally mounted in said housing intermediate its length, means yieldingly interengaging said housing and the portion of said lever extending below the pivot point thereof and arranged to limit movement of rotation of the lever in either direction, a frame extending substantially parallel to said lever, a link pivotally interconnecting said lever and said frame intermediate the length of both, yielding connection between the extension of said link and said lever arranged to limit relative movement of the frame and the lever, and connecting means disposed above said link and yieldingly interengaging said frame and said lever.

8. A motor mounting comprising a pivotally mounted lever having a vertical component of extent, a substantially L-shaped motor supporting assembly proper carried by said lever, pivotal connection between said lever and one leg of said motor supporting assembly proper intermediate the length of said lever and said leg, and a yielding connection below said pivotal connection arranged to dampen vertical vibration of said motor supporting assembly proper relatively to said lever.

9. A motor mounting comprising a pivotally mounted lever having a vertical component of extent, a substantially L-shaped motor assembly proper carried by said lever, pivotal connection between said lever and one leg of said motor assembly proper intermediate the length of said lever and said leg, and yielding connection between said lever and said motor assembly proper above the pivotal connection therebetween arranged to dampen horizontal vibration of said motor assembly proper relatively to said lever.

10. A motor mounting comprising a pivotally mounted lever having a vertical component of extent, a substantially L-shaped motor supporting assembly proper carried by said lever, pivotal connection between said lever and one leg of said motor assembly proper intermediate the length of said lever and said leg, a yielding connection below said pivotal connection arranged to dampen vertical vibration of said motor supporting assembly proper, and yielding connection above the pivotal connection arranged to dampen horizontal vibration of said motor supporting assembly proper relatively to said lever.

11. A motor mounting comprising the combination of a mounting frame, a lever pivotally mounted in said frame intermediate its length, means yieldably interengaging said frame and the portion of said lever extending below the pivot point thereof and arranged to limit rotation of the lever in either direction, a substantially L-shaped motor assembly proper carried by said lever, pivotal connection between said lever and one leg of said motor assembly proper intermediate the length of said lever and said leg, and a yielding connection below said pivotal connection arranged to dampen vertical vibration of said motor assembly proper relatively to said lever.

12. In combination with a vertical housing a motor supporting platform extending substantially horizontally from said housing, a lever arm pivoted in the housing, connections between said housing and said lever arm arranged to definitely limit and yieldingly dampen rotating movement of the arm in both directions of rotation, and pivotal connection between said lever arm and said motor supporting platform.

13. A motor supporting platform comprising a pivotally mounted lever having a vertical component of extent, a motor suspending arm carried by said lever, pivotal connection between said lever and said motor suspending arm intermediate the length of said lever and said arm, and yielding connection below said pivotal connection arranged to dampen vertical vibration of said motor suspending arm relatively to said lever.

14. A motor mounting comprising a pivotally mounted lever having a vertical component of extent, a motor suspending arm, pivotal connection between said lever and said motor suspending arm intermediate the length of said lever and said arm, and yielding connection between said lever and said motor suspending arm above the pivotal connection therebetween arranged to dampen horizontal vibration of said motor suspending arm relatively to said lever.

15. A motor mounting comprising a pivotally mounted lever having a vertical component of extent, a motor suspending arm, pivotal connection between said lever and said motor suspending arm intermediate the length of said lever and said arm, a yielding connection below the pivotal connection arranged to dampen vertical vibration of said motor suspending arm relatively to said lever, and yielding connection above the pivotal connection arranged to dampen horizontal vibration of said motor supporting arm relatively to said lever.

In witness whereof, I hereunto set my hand.

JOHN N. SCISM.